United States Patent [19]

Lu

[11] Patent Number: 4,870,122
[45] Date of Patent: Sep. 26, 1989

[54] HDPE FILMS WITH IMBALANCED BIAXIAL ORIENTATION

[75] Inventor: Pang-Chia Lu, Pittsford, N.Y.

[73] Assignee: Mobil Oil Corporation, New York, N.Y.

[21] Appl. No.: 101,894

[22] Filed: Sep. 28, 1987

[51] Int. Cl.$^4$ ............ C08J 5/18; C08L 23/06
[52] U.S. Cl. ............ 524/488; 526/348.1; 525/240; 428/516; 264/290.2
[58] Field of Search ...... 525/240; 526/348.1; 524/488; 264/290.2

[56] References Cited

U.S. PATENT DOCUMENTS

| | | | |
|---|---|---|---|
| 3,179,720 | 4/1965 | Hillman | 525/240 |
| 3,340,328 | 9/1967 | Brindell et al. | 525/240 |
| 3,976,612 | 8/1976 | Kaji et al. | 525/240 |
| 3,998,914 | 12/1976 | Lillis et al. | 525/240 |
| 4,226,905 | 10/1980 | Harbourne | 526/348.1 |

FOREIGN PATENT DOCUMENTS 0111602 6/1984 European Pat. Off. .
849389 9/1960 United Kingdom ............ 524/488

OTHER PUBLICATIONS

Derwent Abstract No. 74-42 588V.

*Primary Examiner*—Carman J. Seccuro
*Attorney, Agent, or Firm*—Alexander J. McKillop; Charles J. Speciale; Robert B. Furr, Jr.

[57] ABSTRACT

High density polyethylene (HDPE) films, preferably containing blends of HDPE resins or microcrystalline wax, are oriented up to about two times in the machine direction and six times or more in the transverse direction to give films having good dead-fold and water vapor transmission characteristics making them highly suited for packaging, particularly for dry foods when coated with or coextruded with a heat sealable layer, e.g. Surlyn.

6 Claims, No Drawings

HDPE FILMS WITH IMBALANCED BIAXIAL ORIENTATION

BACKGROUND OF THE INVENTION

High density polyethylene films which are biaxially oriented in a balanced fashion to a degree of greater than 6.5 times in both the machine direction (MD) and the transverse direction (TD) are described in British Pat. No. 1,287,527.

U.S. Pat. No. 4,680,207 relates to imbalanced biaxially oriented films of linear low density polyethylene oriented up to six times in the machine direction, and up to three times in the transverse direction but less than in the machine direction.

Blown films of HDPE having a ethylene-vinyl acetate heat seal coating used for food packaging but such films must have a thickness of about two mils to meet the water vapor transmission (WVTR) requirements for packaging suitable for dry foods such as cereals. Moreover, blown HDPE films do not exhibit the dead-fold properties desirable in food packages particularly of the bag-in-box type.

In accordance with this invention, good WVTR properties can be achieved in HDPE film of about one mil thickness. The films also have dead-fold characteristics which make them well suited for packaging of foods in bag-in-box operations conducted on vertical, form, fill and seal (VFFS) machinery.

SUMMARY OF THE INVENTION

Films of high density polyethylene (HDPE) having a density of 0.96 or higher are biaxially oriented in an imbalanced manner to a degree of 1.25:1 to about 2:1 in the machine direction (MD) and to a degree of about 6:1 to about 12:1 in the transverse direction (TD). These films have reduced water vapor transmission (WVTR), improved dead-fold, and other physical properties which are markedly better than blown HDPE films. When provided with a heat-seal layer by coextrusion, or coating the films are particularly suited for use in packaging, especially of dry foodstuffs.

DETAILED DESCRIPTION OF THE INVENTION

The imbalanced biaxially oriented films of this invention are prepared using a major proportion of a high density polyethylene (HDPE) having a density of at least 0.96. The film can be composed exclusively of a single HDPE resin, a mixture of HDPE resins, or of HDPE containing a minor proportion up to about 10 weight percent microcrystalline wax. The mixture of HDPE resins gives better processing characteristics in the extruder by reducing extruder torque. Films made with either a blend of HDPE resins or with microcrystalline wax reduce splittiness of the film which manifests itself as the tendency of the film to break in the TD direction during operation on vertical, form, fill and seal (VFFS) machinery.

The blends of HDPE polymers can comprise two or more polymers all of which preferably have densities of 0.96 or greater. Blends of HDPE polymers advantageously comprise a major proportion of HDPE having a melt index of 0.6 to 1.2 and one or more polymers having a different melt index.

Terblends have been found particularly desirable. Suitable terblends generally comprise 50 to 98 weight percent, preferably 84 to 96 weight percent of HDPE having a density of 0.96 or higher and a melt index of greater than 0.5 to about 2.0; 1 to 25 weight percent, preferably 3 to 8 weight percent of HDPE having a density of 0.96 or greater and a melt index of 0.1 to 0.5; and 1 to 25 weight percent, preferably 3 to 8 weight percent, of HDPE having a density of 0.96 or higher and a melt index of greater than 2 to about 8. Preferably, the second and third HDPE polymers which are minor components are present in about equal amounts.

It is highly desirable that the unbalanced biaxially oriented HDPE films of this invention be provided with a heat seal layer. The heat seal layer can be applied in the known manner to the HDPE, for example by coating or coextrusion before orientation or by coating the HDPE after one or both of the biaxial orientation operations.

The heat seal layer can be any of the conventional material used for this purpose in conjunction with polyolefin films particularly polyethylene films. For example ethylene-vinyl acetate copolymers or ethylene-methacrylic acid salt ionomers (available from DuPont as "Surlyn") can be used. Films in which the heat seal layer is a ethylene-methacrylic acid salt ionomer have been found to be particularly useful in preparing films which are suitable for VFFS applications. The heat seal layer can comprise the heat seal resin as such or can include small amounts of other materials. For example, the relatively costly Surlyn ionomer can be mixed with small amounts of less costly materials such as low density polyethylene.

The HDPE films of this invention can include other polymer layers in addition to or instead of the heat seal layer, for example polymers having desirable barrier properties for gases such as oxygen.

The degree of orientation of the HDPE films is an important aspect of this invention inasmuch as the proper degree of orientation provides desirable physical properties, good WVTR characteristics and dead-fold. For example, it has been determined that the films of this invention having a thickness of 1.0 to 1.2 mils will have acceptable WVTR (g-mil/100 $in^2$-24 $hr^{-1}$ atm) of less than about 0.28 whereas a somewhat heavier gauge (1.5 times thicker or more) is needed in a blown HDPE film. The benefits of reduced WVTR are due to the improvements obtained by biaxial orientation as well as the improvements due to the ability to use higher density HDPE polymers in the cast extrusion process of this invention than is possible in blown film extrusion. Lower density HDPE polymers are generally required in blown film extrusion because the higher density resins (density greater than about 0.957) are not processable in the blown film process in a practical commercial manner. Although higher density HDPE resin having a density of 0.957 or greater can be made directly into thin films by cast extrusion, problems of curling, uniformity, flatness and high WVTR remain as obstacles. Accordingly, thin HDPE films of about 0.8 to 1.5 mils having the best balance of properties, particularly for VFFS applications, are obtained in the imbalanced biaxially oriented films of this invention prepared from films having a cast gauge of 12 to 20 mils which are reduced to the desired gauge by orientation.

The films are produced and oriented in the conventional manner. When a heat sealable layer is present on one side of the HDPE film cast extrusion is generally accomplished using a multi-roll stack system having three or more rolls. The rolls on the HDPE side are advantageously maintained at about 65° C. and the heat seal sides at a temperature of about 20° C.

In the usual manner the film is heated to its orientation temperature and first subjected to MD orientation between two sets of nip rolls the second rotating at a greater speed than the first in an amount equal to the desired draw ratio. Then the film is TD oriented by heating and subjecting it to transverse stretching in a tenter frame. Typically MD orientation is conducted at nip roller 60° to 120° C. and TD orientation at air oven 110° to 145° C.

The HDPE films of this invention can be produced with excellent quality at caster speeds of upo to about 110 fpm corresponding to line speeds of 140 fpm at 1.25 times MD orientation.

The invention is illustrated by the following non-limiting examples in which all parts are by weight unless otherwise specified.

EXAMPLES 1-2

Two layer biaxially oriented films having a 1 mil final thickness were prepared bycoextruding a primary HDPE layer comprising 95% of the film thickness and a Surlyn 1652 (ethylene-methacrylic acid copolymer salt ionomer from DuPont) layer comprising 5% of the film thickness. The films were prepared in a three roll stack system with the roll temperatures for the HDPE side at 65° C. and 20° C. for the Surlyn side. The films were then oriented 1.4 times in the MD at about 115° C. and 10 times in the TD direction at 115°-140° C. in a tenterframe.

The HDPE Example 1 was PE-5849 (density 0.96, melt index 1.0, from DuPont). In the Example 2, 90% by weight of PE-5849 was blended with 5% by weight of PE-5925 (density 0.96, melt index 0.45, from DuPont) and 5% by weight of PE-7835 (density 0.96, melt index 3.0, from Dupont).

The film of Example 2 exhibited a crimp seal range and a hot tack range of 80°-120° C., and performed well on the VFFS packaging machine while the Example 1 performed unacceptably having excessive TD splittiness. The physical properties of the films however, are comparable and are summarized in Table 1.

TABLE 1

| | | Example 1 | Example 2 |
|---|---|---|---|
| Tensile | MD | 6 | 6 |
| (psi × 10³) | TD | 16 | 20 |
| Modulus | MD | 365 | 380 |
| (psi × 10³) | TD | 490 | 570 |
| Stiffness | MD | 17 | 20 |
| (grams) | TD | 21 | 24 |
| Tear Strength | MD | 89 | 63 |
| (g/mil) | TD | 4 | 5 |
| WVTR (g-mil/100 in²/24 hr at 1 atm) | | 0.23 | 0.24 |

EXAMPLES 3-4

In a manner similar to that of Example 1, the film of Example 3 was prepared and compared to the film in which the HDPE layer contained 4% by weight of microcrystalline wax (Example 4). The film of Example 3 had a crimp-seal range and hot-tack 105°-120° C. but exhibited numerous TD splits on the VFFS machine, making it unacceptable for this purpose. The film of Example 4 had a crimp-seal and hot-tack range 90°-120° C. with no splitting.

The physical properties of the films are summarized in Table 2.

TABLE 2

| | | Example 3 | Example 4 |
|---|---|---|---|
| Tensile | MD | 5 | 5 |
| (psi × 10³) | TD | 37 | 35 |
| Modulus | MD | 330 | 340 |
| (psi × 10³) | TD | 740 | 730 |
| Stiffness | MD | 19 | 19 |
| (grams) | TD | 32 | 31 |
| Tear Strength | MD | 50 | 44 |
| (g/mil) | TD | 2 | 2 |
| WVTR (g-mil/100 in²/24 hr at 1 atm) | | 0.24 | 0.24 |

I claim:

1. A biaxially oriented high density polyethylene film comprising at least 50 weight percent of a high density polyethylene (HDPE) having a density of 0.96 or higher which is oriented in the solid state to a degree of from about 1.25:1 to about 2:1 in the machine direction, and to a degree of from about 6:1 to about 12:1 in the transverse direction.

2. The film of claim 1 in which the degree of transverse direction orientation is at least 4 times greater than the degree of machine direction orientation.

3. The film of claim 1 comprising a major proportion of a first HDPE having a density of 0.96 or higher and a melt index from about 0.6 to 1.2 and a second HDPE having a density of 0.96 or higher and a different melt index than said first HDPE.

4. The film of claim 1 comprising 50 to 98 weight percent of a first HDPE having a density of 0.96 or higher and a melt index of greater than 0.5 to 2.0; 1 to 25 weight of a second HDPE having a density of 0.96 or higher and a melt index of 0.1 to about 0.5; and 1 to 25 weight percent of a third HDPE having a density of 0.96 or higher and a melt index of greater than 2.0 to about 8.

5. The film of claim 4 in which said first HDPE comprises at least about 84 weight percent and said second and third HDPE resins each comprises 3 to 8 weight percent of said film.

6. The film of claim 1 containing up to about 10 weight percent of microcrystalline wax.

* * * * *

UNITED STATES PATENT AND TRADEMARK OFFICE
CERTIFICATE OF CORRECTION

PATENT NO. : 4,870,122
DATED : September 26, 1989
INVENTOR(S) : Pang-Chia Lu

It is certified that error appears in the above-identified patent and that said Letters Patent is hereby corrected as shown below:

Col. 3, line 13   "upo" should be --up to--
Col. 3, line 23   "bycoextruding" should be --by coextruding--

Signed and Sealed this

Sixth Day of November, 1990

Attest:

HARRY F. MANBECK, JR.

Attesting Officer   Commissioner of Patents and Trademarks